United States Patent [19]
Crabbe

[11] 3,872,149
[45] Mar. 18, 1975

[54] 9-HYDROXY PROSTA-5-CIS, 11,13-TRANS-TRIENOIC ACIDS AND DERIVATIVES THEREOF

[75] Inventor: Pierre Crabbe, Grenoble, France

[73] Assignee: Syntex (U.S.A.) Inc., Palo Alto, Calif.

[22] Filed: June 25, 1973

[21] Appl. No.: 373,597

[52] U.S. Cl..... 260/468 D, 260/240 R, 260/243.65, 260/343.2 R, 260/345.7, 260/345.8, 260/346.2 R, 260/347.3, 260/347.4, 260/410, 260/448 R, 260/468 R, 260/468 G, 260/469, 260/473 G
[51] Int. Cl............................................ C07c 61/32
[58] Field of Search..................... 260/468 D, 514 D

[56] References Cited
OTHER PUBLICATIONS
Jones, British J. Pharmacology, 45, 144P (1972).
Corey et al., JACS, 95, 7185 (1973).

Primary Examiner—Robert Gerstl
Attorney, Agent, or Firm—Gerard A. Blaufarb; Leon Simon; William B. Walker

[57] ABSTRACT

Novel prosta-5-cis,11,13-trans-trienoic acids having oxygenated functions at C-9 and C-15 positions, the 15-methyl, ethyl and propyl derivatives as well as the C-20-nor, bisnor or C-20 alkyl derivatives thereof, process for preparing such compounds and novel intermediates obtained thereby. $9\alpha$, $15\alpha$-dihydroxypprosta-5-cis,11,13-trans-trienoic acid and 9-keto-15$\alpha$-hydroxyprosta-5-cis,11,13-trans-trienoic acid are representatives of the class. Also included are the pharmaceutically acceptable, non-toxic esters and salts of the carboxylic acid function and the pharmaceutically acceptable, non-toxic esters or ethers of the secondary hydroxyl groups. These compounds possess prostaglandin-like activities and thus are useful in the treatment of mammals, where prostaglandins are indicated.

16 Claims, No Drawings

9-HYDROXY PROSTA-5-CIS, 11,13-TRANS-TRIENOIC ACIDS AND DERIVATIVES THEREOF

The present invention relates to certain novel prostaglandin derivatives, to a process for the production thereof and to certain novel intermediates obtained by this process.

More particularly, the present invention relates to novel prosta-5-cis,11,13-trans-trienoic acids having oxygenated functions at C-9 and C-15 positions, which may be additionally substituted at C-15 by a methyl, ethyl or propyl group, to the C-20 nor or bisnor derivatives and to the C-20 alkyl derivatives thereof, the alkyl group being of a straight chain and containing from 1 to 5 carbon atoms inclusive. Also encompassed are the pharmaceutically acceptable, non-toxic esters and salts of the carboxylic acid function, as well as the pharmaceutically acceptable, non-toxic esters and ethers of the secondary hydroxyl groups.

Prostaglandins are members of a new hormonal system with a remarkable range of biological and pharmaceutical properties. These compounds belong to a group of chemically related 20-carbon chain hydroxy fatty acids containing a five membered ring in the structure and different degrees of unsaturation, a number of which have been reported in the literature. For a review on prostaglandins and the definition of primary prostaglandins, see for example S. Bergstrom, *Recent Progress in Hormone Research*, 22, pp. 153–175 (1966) and *Science*, 157, page 382 (1967) by the same author.

Prostaglandins are widely distributed in mammalian tissues and have been isolated from natural sources in very small amounts. In addition, a number of the natural occurring prostaglandins have been prepared by chemical synthesis; note for example, *J. Am. Chem. Soc.*, 91, page 5675 (1969); *J. Am. Soc.*, 92, page 2586 (1970) and *J. Am. Chem. Soc.*, 93, pages 1489–1493 (1971) and references cited therein, W. P. Schneider et al., *J. Am. Chem. Soc.*, 90, page 5895 (1968); U. Axen et al., *Chem. Commun.*, page 303 (1969) and W. P. Schneider, *Chem. Commun.*, page 304 (1969).

Because of the remarkable range of biological and pharmacological properties exhibited by this family of compounds, a great deal of interest has focused upon such compounds, and the preparation of analogs of such compounds; accordingly, we have discovered processes and intermediates for preparing modified prostaglandins and derivatives thereof.

The novel prostaglandin derivatives of the present invention can be represented by the following formulas:

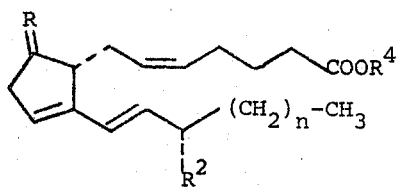

(A)

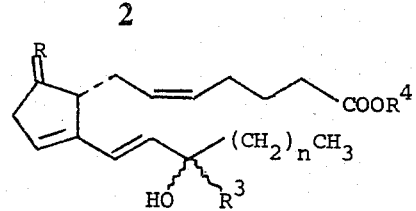

(B)

wherein
R represents a keto group or the grouping

in which
R$^1$ is hydrogen or a conventionally hydrolyzable ester or ether group;
R$^2$ represents hydroxy or a conventionally hydrolyzable ester or ether thereof;
R$^3$ represents methyl, ethyl or propyl;
R$^4$ represents hydrogen, a lower alkyl group or the pharmaceutically acceptable, non-toxic salts of compounds in which R$^4$ is hydrogen; and $n$ is an integer of from 2 to 9; provided that when R$^3$ is $\alpha$ the hydroxyl group, attached to the same carbon atom as R$^3$, is $\beta$; and when R$^3$ is $\beta$ the hydroxyl group, attached to the same carbon atom as R$^3$, is $\alpha$.

The dotted lines shown in the above formulas and in the formulas below indicated that the substituents are in $\alpha$ configuration, i.e., below the plane of the cyclopentane ring.

The wavy lines ($\xi$) indicate the $\alpha$ or $\beta$ configuration, or mixtures thereof.

The double bonds at C-5 and C-13 in the compounds of the present invention have the same configuration as in natural prostaglandins of the PGE$_2$ or PGF$_{2\alpha}$ series, i.e., the double bond at C-5,6 is in cis configuration and the double bond at C-13,14 is in trans configuration.

The preferred meaning of n is 4, i.e., the preferred compounds of the invention are those having the usual C-20 carbon chain of natural prostaglandins.

These novel compounds possess asymmetric centers and thus can be produced as racemic mixtures. The racemic mixtures can be resolved if desired, at appropriate stages by methods known to those skilled in the art, to obtain the respective individual (d) and (l) isomers. It is to be understood that the individual optical isomers as well as mixtures of such isomers are encompassed within the scope of the present invention.

As used herein above and below, the following terms have the following meanings unless expressly stated to the contrary. The term "lower alkyl" refers to a lower alkyl group containing one to three carbon atoms, and particularly methyl, ethyl and propyl.

The term "conventionally hydrolyzable esters or ethers," as used herein, refers to those physiologically acceptable hydrolyzable ester and ether groups employed in the pharmaceutical art which do not significantly adversely affect the pharmaceutical properties of the parent compound. The conventionally hydrolyzable esters are derived from hydrocarbon carboxylic acids. The term "hydrocarbon carboxylic acid" defines both substituted and unsubstituted hydrocarbon carboxylic acids. These acids can be completely saturated or possess varying degrees of unsaturation including aromatic, can be of straight chain, branched chain or cyclic structure, and preferably contain from one to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus inclined within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-$\beta$, $\beta$-dimethylglutarate, acetoxyacetate, 2-chloro-4-nitro-benzoate, aminoacetate, diethylaminoacetate, piperidinoacetate, $\beta$-chloropropionate, trichloroacetate, $\beta$-chlorobutyrate, bicyclo-[2.2.2]-octane-1-carboxylate, 4-methylbicyclo-[2.2.2]-oct-2-ene-1-carboxylate, and the like. The preferred conventional hydrolyzable ester is acetate.

"Conventional hydrolyzable ethers" include the methyl, ethyl, cyclopentyl, tetrahydrofuran-2-yl, tetrahydrofuran-2-yl and 4-methoxytetrahydropyran-4-yl ethers.

The additional salts are derived from pharmaceutically acceptable basic salts, including metal salts such as sodium, potassium, calcium, magnesium, aluminum and the like, as well as organic amine salts such as ammonium, triethylamine, 2-dimethylaminoethanol, 2-diethylaminoethanol, lysine, arginine, caffeine, procaine, N-ethylpiperidine, hydrabamine and the like. The term "pharmaceutically acceptable" refers to salts which do not significantly adversely affect the properties of the parent compound.

The novel prostaglandin derivatives of the present invention can be obtained by a process illustrated by the following sequence of reactions:

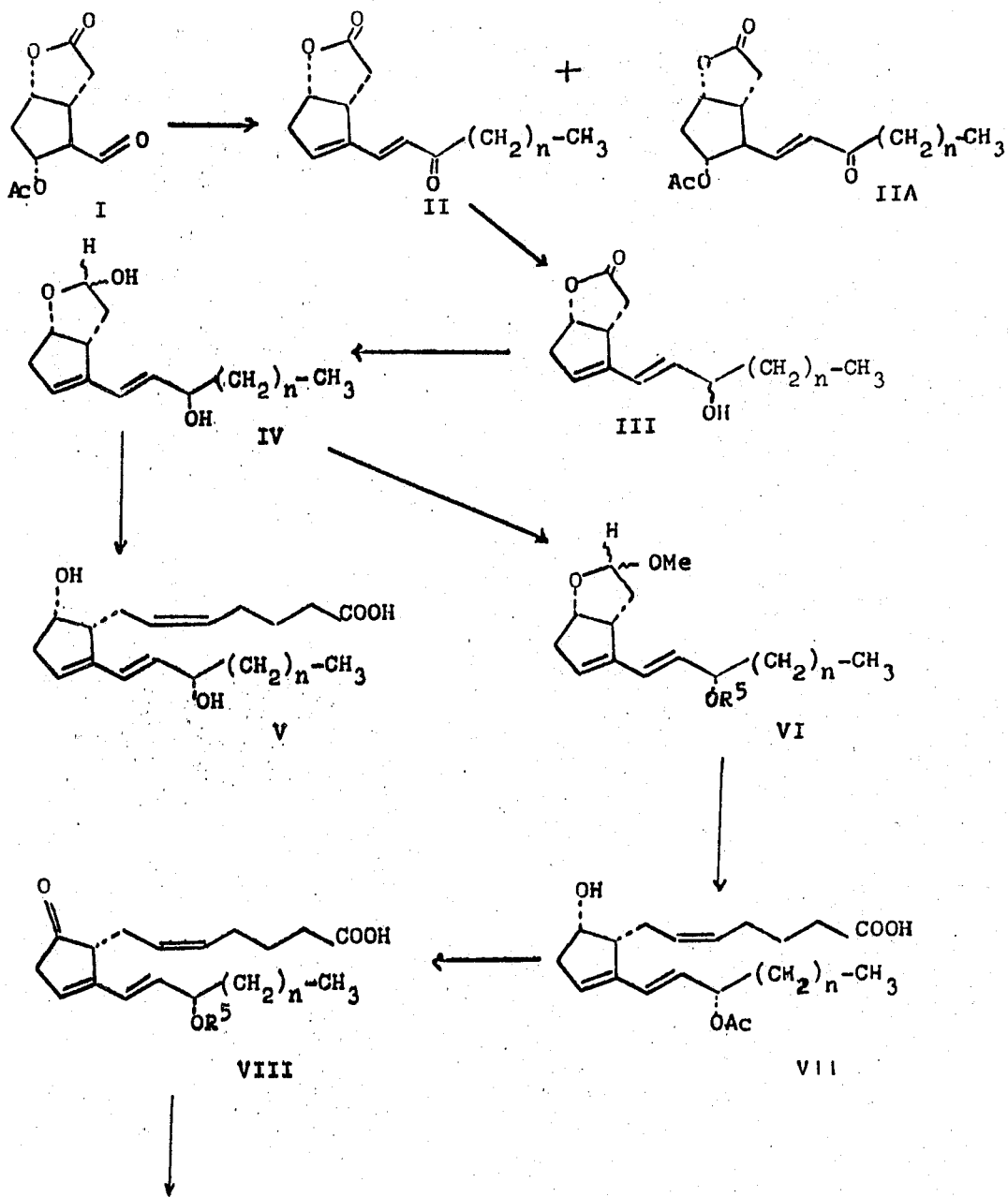

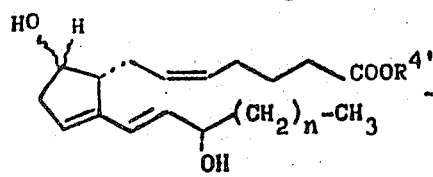

V-A

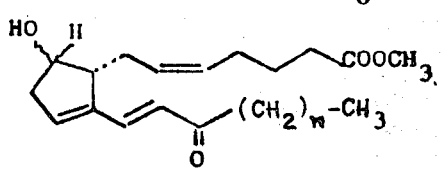

IX

IX

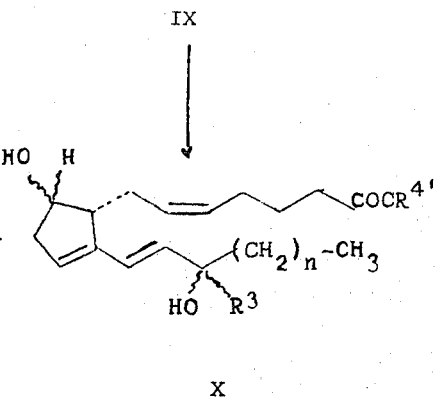

X

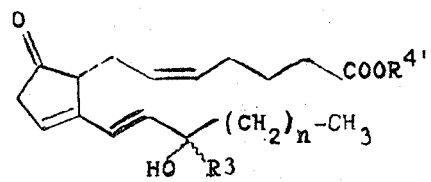

XI wherein $R^3$ and n have the above-indicated meaning, $R^{4'}$ is hydrogen or methyl, $R^5$ is hydrogen or a lower acyl group, particularly the acetyl group and Ac is acetyl.

In practicing the process outlined above the starting compound of formula I, (2'α-hydroxy-4'α-acetoxy-5'β-formylcyclopent-1'α-yl)-acetic acid 1,2'-lactone is condensed with the sodium anion of a dimethyl-2-oxo-n-alkylphosphonate of the formula:

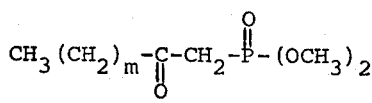

wherein m is an integer of from 2 to 9, in dimethoxyethane solution, to produce a mixture of the trans-dienone lactone of formula II and the trans-enone lactone of formula IIA. This transformation involves a modified Wittig reaction. Procedures for the Wittig reaction are well known in the art, see for example S. Trippet et al., *Adv. in Organic Chemistry*, Vol. 1, pp. 83–102, S. Trippet, *Quarterly Reviews*, Vol. 17, pp. 400–440. Typically, the reaction is conducted under an inert atmosphere, e.g., under nitrogen or argon atmosphere, at temperatures between 0°C and 40°C, preferably at room temperature or below, using at least one molar equivalent of the reagent per mole of starting aldehyde, I, and preferably 1.2 to 2 moles. This reaction is carried out for a period of about 1 to 4 hours, depending on the temperature and concentration of the reaction mixture. In the preferred conditions, the reaction is conducted at room temperature for about from 1 to 2 hours. The reaction product can be recovered from the reaction mixture by neutralization of the excess base with acetic acid to pH 7, followed by evaporation of the solvent under high vacuum, at low temperature or by adding water and extracting the product with a suitable solvent immiscible with water, e.g., methylene chloride, diethyl ether and the like, followed by evaporation of the solvent. The crude product can be further purified by conventional techniques, such as chromatography on silica gel or thin-layer chromatography, to separate compounds II and IIA. Treatment of compounds IIA with a base in a lower aliphatic alcohol such as methanol or ethanol affords compound II, thus increasing the yield of the latter compound. Adequate bases for this transformation are alkali metal hydroxides, alkoxides or carbonates, e.g., sodium hydroxide, sodium methoxide, potassium carbonate and the like; the reaction is conveniently effected at room temperature, for a period of time of the order of 1 to 4 hours, preferably for about 2 hours, under nitrogen or argon atmosphere.

The dimethyl-2-oxo-n-alkylphosphonates used as reagents can be prepared in accordance with the method described by E. J. Corey et al., in *J. Am. Chem. Soc.*, 88, 5654, from dimethyl-α-lithiomethanephosphonate and an ester of an n-alkanoic acid containing from 4 to 10 carbon atoms, e.g., ethyl-n-butanoate, methyl n-caproate and ethyl n-decanoate. Examples of suitable reagents thus obtained are: dimethyl-2-oxopentylphosphonate, dimethyl-2-oxoheptylphosphonate, dimethyl-2-oxononylphosphonate and dimethyl-2-oxododecylphosphonate.

Upon selective reduction of a trans-dienone lactone of formula II with a solution of zinc borohydride in an ether solvent such as dimethoxyethane there is obtained a mixture of the corresponding α and β-hydroxy compounds of formula III (R and S isomers). The reaction is conducted at temperatures in the range of about 5° to 20°C for about from 15 minutes to 3 hours, preferably using an excess of zinc borohydride. (The zinc borohydride reagent solution can be prepared from freshly fused zinc chloride and sodium borohydride in dimethoxyethane.) The reaction product is isolated from the reaction mixture by conventional techniques, and the epimeric α and β-hydroxylated compounds are then separated by thin-layer chromatography.

By reduction of the compounds of formula III, there are obtained the isomeric lactols of formula IV. This reduction is preferably effected by treatment with an excess of diisobutylaluminum hydride in a suitable inert organic solvent, using from 1.5 to 6 molar equivalents of the reagent per molar equivalent of compounds III, and preferably about two molar equivalents. The reaction is typically conducted at about −30°C to −78°C, preferably at about −60°C, for a period of time of the order of 1 to 5 hours, 2 hours being generally sufficient to complete the reaction. Suitable organic solvents for this reaction are the aromatic hydrocarbons such as toluene or xylene. The product is isolated from the reaction mixture by conventional extraction with a suitable organic solvent immiscible with water followed by evaporation.

Condensation of a crude lactol of formula IV with the Wittig reagent derived from 5-triphenylphosphoniopentanoic acid and sodium methylsulfinyl carbanion in dimethylsulfoxide solution yields the prostadienoic acid derivative of formula V, e.g., $9\alpha,15\alpha$-dihydroxyprosta-5-cis,11,13-trans-trienoic acid (V, $n = 4$) or the corresponding C-20-nor or bisnor or C-20 alkyl derivatives thereof.

This condensation is typically conducted at about room temperature, for about from two to 24 hours under anhydrous conditions. Conveniently, the reaction is followed by thin-layer chromatography and discontinued when substantially completed. This reaction is preferably carried out under an inert atmosphere, i.e., under argon or nitrogen atmosphere. The initial product is obtained as the sodium salt soluble in water. The free acid can be liberated by acidification with, for example, dilute hydrochloric acid to pH 2, followed by conventional extraction and evaporation. The prostaglandin derivative is further purified by thin-layer chromatography.

The 5-triphenylphosphoniopentanoic acid can be prepared as described by R. Greenwald et al., in *J. Org. Chem.*, 28, 1128 (1963), from 5-bromopentanoic acid and triphenylphosphine in acetonitrile. The sodium methylsulfinyl carbanion is obtained from sodium hydride and dimethylsulfoxide, stirring the mixture at about 75°C until the evolution of gas ceases. Generally, it is recommended to prepare these reagents just prior to the reaction with the lactol of formula IV.

Typically, a molar excess of reagents is used relative to the starting lactol IV. Preferably the triphenylphosphoniopentanoic acid is used in amounts varying from about two to about 5.0 moles per mole of starting compound, while the amounts of sodium methylsulfinyl carbanion vary between about two to about ten moles. Best results are obtained using 4.5 molar equivalents of the acid reagent and five molar equivalents of the anion per mole of the lactol of formula IV.

In order to obtain the 9-keto-prostatrienoic acid compounds of formula VIII ($R^5 = H$), the lactols of formula IV are treated with methanol in the presence of catalytic amounts of a strong mineral or organic acid, i.e., using p-toluenesulfonic acid, perchloric acid or hydrochloric acid as catalyst, thus affording the methyl ethers of formula VI, ($R^5 = H$) in which the hydroxyl group is esterified in a conventional manner, using particularly acetic anhydride in pyridine solution, to yield the corresponding acetoxy derivative (VI, $R^5 =$ acetyl); the methyl ether group is then hydrolyzed under acidic conditions, e.g., using a dilute solution of hydrochloric acid in acetonitrile, to regenerate the free lactol moiety and thereafter the lactol is condensed with the Wittig reagent derived from 5-triphenylphosphoniopentanoic acid and sodium methylsulfinyl carbanion as described hereinabove in detail with regard to the transformation of a free hydroxylated compound of formula IV into a compound of formula V, to yield the 15-acetoxy prostatrienoic acid derivative of formula VII (acetoxy derivative of compound of formula V). The compounds of formula VII are then oxidized with chromium trioxide, using particularly an 8N solution of chromium trioxide in acetone solution and in the presence of sulfuric acid (Jones' reagent) or chromium trioxide-dipyridine complex (Collins' reagent) to afford the corresponding 9-keto prostatrienoic acid derivative of formula VIII, e.g., 9-keto-15α-acetoxyprosta-5-cis,11,13-trans trienoic acid (VIII, $R^5 =$ acetyl), or the corresponding C-20 nor or bisnor or C-20 alkyl derivatives thereof, which are hydrolyzed to the corresponding 15-hydroxy derivatives (VIII, $R^5 = H$). As the double bond at the 11(12)-position is unstable under alkaline conditions, shifting readily to the 8(12)-position, this hydrolysis is effected by enzymatic methods using particularly as hydrolyzing agent the enzymes contained in the gorgonian *Plexaura homomalla*, after extraction of its lipid soluble contents. The hydrolysis is effected in a buffered aqueous solution containing sodiuim chloride and calcium chloride, at a neutral or almost neutral pH, i.e., at a pH of about 7.2 to 7.7. The 15-acetoxy compound (VIII, $R^5 =$ acetyl) is dissolved in the saline solution by sonication, and to the solution are added from about 5 to about 20 parts by weight of finely ground gorgonian (which has been previously treated with the saline solution) stirring the reaction mixture at a temperature of about 20° to 37°C, preferably at room temperature, for a period of time of the order of 16 to 24 hours. The course of the reaction can be followed by thin-layer chromatography; when the hydrolysis is complete, the free acid can be isolated from the reaction mixture by conventional techniques, such as filtration of the insoluble material followed by acidification of the filtrate with a dilute acid solution, e.g., using dilute hydrochloric acid, extraction with a solvent immiscible with water such as diethyl ether, ethyl acetate, chloroform, methylene chloride, and the like, evaporation of the solvent and purification of the residue by column chromatography, thin-layer chromatography or liquid chromatography.

Alternatively, this hydrolysis can be effected using a C-esterase e.g., from orange peel or hog's kidney [J. D. A. Jeffery et al., *Biochem. J.*, 81, page 591 (1961) and F. Bergmann et al., *Biochem. J.*, 77, page 209 (1960), respectively].

The carboxylic acid function in a compound of formula VIII ($R^5 = H$) is then esterified with a diazoalkane, particularly with diazomethane, in a conventional manner, and the keto group in the methyl ester compound thus obtained is in turn reduced with sodium borohydride in a lower aliphatic alcohol such as methanol or ethanol solution, at about room temperature for a period of time in the range of 30 minutes to one hour, to produce a mixture of the corresponding $9\alpha$ and $9\beta$-hydroxy compounds, which are separated by chromatography on silica gel, obtaining approximately equal amounts of each isomer (VA, $R^{4'} = Me$).

Upon selective oxidation at C-15 of a $9\alpha$ or $9\beta$, $15\alpha$-dihydroxy compound of formula VA ($R^{4'} = Me$) with an excess of 2,3-dichloro-5,6-dicyano-1,4-benzoquinone or manganese dioxide in a suitable inert organic solvent, e.g., dioxane, chloroform, tetrahydrofuran and the like, there is produced the corresponding 15-keto compound of formula IX. When the oxidation is effected using 2,3-dichloro-5,6-dicyano-1,4-benzoquinone as reagent, the reaction is preferably conducted at a temperature above room temperature, i.e., at about 40° to 50°C, using particularly benzene or dioxane as solvents, for a period of time of the order of 14 to 20 hours, preferably for about 18 hours. When manganese dioxide is used as reagent the reaction is preferably conducted in chloroform of tetrahydrofuran, at room temperature for a period of time of 18 to 40 hours, adding the oxidizing agent portionwise, at 4–6 hours intervals.

In any case, the reaction can be followed by thin-layer chromatography or by periodic determination of the ultraviolet spectrum. When the reaction is complete, the product is isolated from the reaction mixture by conventional techniques, e.g., by separation of the insoluble material by filtration, evaporation of the filtrate and purification of the residue by chromatographic techniques.

Treatment of a compound of formula IX with an excess of an alkylmagnesium halide, i.e., using methyl-, ethyl- or propylmagnesium bromides or chlorides, there is obtained the corresponding 15ξ-alkyl-15ξ-hydroxy compound of formula X ($R^3$ = Me, Et, Pr, $R^{1'}$ = Me) as a mixture of 15 (R) and 15 (S) isomers.

This reaction is preferably carried out in anhydrous ether or tetrahydrofuran solution, using from 6 to 18 molar equivalents of the Grignard reagent per molar equivalent of the starting compound, at a temperature of between −25°C to room temperature, for a period of time of 1 to 4 hours, under an inert atmosphere.

In the preferred embodiments, the reaction is conducted by adding the reagent to a previously cooled solution (−25°C) of compound IX in diethylether solution under argon or nitrogen atmosphere, allowing the reaction mixture to attain room temperature, and following the course of the reaction by thin-layer chromatographic techniques, the reaction being generally complete within about 2 hours.

Alternatively, the reaction can be carried out using an alkyl lithium as reagent, i.e., methyl-, ethyl- or propyllithium, however, a more selective alkylation is obtained when using a Grignard reagent.

The mixture of 15α-hydroxy-15β-alkyl and 15β-hydroxy-15α-alkyl compounds [15 (S) and 15 (R) prostatrienoic acid derivatives respectively] is separated into the individual isomers by thin-layer chromatography.

Upon oxidation of a compound of formula X ($R^{4'}$ = $CH_3$) with chromium trioxide, using particularly chromium trioxide-dipyridine complex (Collins' reagent), there is produced the corresponding 11-keto derivative of formula XI ($R^{4'}$ = Me).

The methyl ester compounds of formulas VA, X and XI ($R^{4'}$ = Me) can be hydrolyzed by enzymatic methods, to yield the corresponding free prostatrienoic acid derivatives (VA, X and XI, $R^{4'}$ = H). This enzymatic hydrolysis is preferably effected using a crude pancreatic lipase commercially available (Sigma Steapsin), however, other enzyme systems which are known as useful for the hydrolysis of compounds unstable to alkaline or acid conditions can also be practical. Other lipases obtainable from bacterial sources, such as the partially purified lipase obtained from *Corynebacterium acnes* culture supernatant can also be used, or a lipase of those that are known to act on water insoluble esters of long chain fatty acids (L. Sarda et al., *Biochem. Biophys. Acta.*, 23:264, 1957), or baker's yeast C. J. Sih et al., *J. C. S. Chem. Comm.*, 240 (1972).

The enzymatic hydrolysis with a crude pancreatic lipase can be conducted in a buffered aqueous solution containing sodium chloride and calcium chloride, at a neutral or almost neutral pH, at a temperature of between 22°C to 30°C, preferably at about 25° to 27°C, adjusting the pH of the reaction mixture to 7.2 to 7.4 by addition of, for example, dilute sodium hydroxide solution, at intervals. The starting alkyl ester compound of formulas VA, X or XI ($R^{4'}$ = $CH_3$) is dissolved in the previously prepared buffered lipase aqueous solution by sonication at about 37°C using from about 0.5 ml. to about 1 ml. of the lipase solution per milligram of substrate. The methyl ester group is readily hydrolyzed within a short period of time, of the order of 5 minutes to 1 hour. The course of the reaction can be followed by thin-layer chromatography; when the hydrolysis is complete, the free acid can be isolated from the reaction mixture by conventional techniques, such as acidification with a dilute acid solution, e.g., using dilute hydrochloric acid, extraction with a solvent immiscible with water, evaporation of the solvent and purification of the crude product by chromatographic techniques.

The compounds of the present invention having secondary hydroxyl groups (V, VA, VIII and X) can be esterified or etherified in a conventional manner, to produce mono- or diesters or mono- or diethers, depending upon the particular prostaglandin derivative. Esterification can be accomplished by reaction of the hydroxylated compound with a carboxylic acid anhydride or chloride of less than 12 carbon atoms in pyridine solution.

Etherification can also be carried out by conventional techniques. For example, reaction with dihydropyran, dihydrofuran or 4-methoxy-5,6-dihydro-2H-pyran in an inert solvent such as, for example, methylene chloride or benzene and in the presence of an acid catalyst, e.g., p-toluenesulfonic acid, or p-toluenesulfonyl chloride, produces the tetrahydropyran-2'-yloxy, tetrahydrofuran-2'-yloxy or 4'-methoxytetrahydropyran-4'-yloxy derivatives, respectively. Methyl, ethyl and cyclopentyl ethers can, for example, be prepared by reaction of the hydroxylated compound with sodium hydride and methyl iodide, ethyl iodide, and cyclopentyl bromide, respectively.

Although the esterification or etherification reactions are usually effected using an excess of the esterifying or etherifying agents, it is preferable to use at least one molar equivalent of said reagents per hydroxyl group present in the starting compound.

The ethyl and propyl esters of the carboxylic acid function can be prepared by treatment of the free acid with an excess of a diazoalkane, i.e., diazoethane or diazopropane in ether or methylene chloride solution, in a conventional manner, or by reaction with the desired lower alkyl iodide in the presence of lithium carbonate, at room temperature.

The salt derivatives of the prostanoic acids of the present invention can be prepared by treating the corresponding free acids with about one molar equivalent of a pharmaceutically acceptable base per molar equivalent of free acid. Suitable pharmaceutically acceptable bases include, for example, sodium hydroxide, potassium hydroxide, magnesium hydroxide, calcium hydroxide, ammonium hydroxide, trimethylamine, triethylamine, tripropylamine, β-dimethylaminoethanol, β-diethylaminoethanol, arginine, lysine, caffeine, procaine and the like. Typically, the reaction is conducted in an aqueous solution, alone or in combination with an inert, water miscible organic solvent, at a temperature of about from 0° to 30°C, preferably at room temperature. Typical inert, water miscible organic solvents include methanol, ethanol, isopropanol, butanol, dioxane and the like. When divalent metal salts are prepared, such as the calcium salts or magnesium salts, the free acid starting material is treated with at least one half molar equivalent of the pharmaceutically acceptable base.

In conducting the above-described processes, it is generally preferred to separate or isolate the respective products of each reaction step prior to their use as starting materials in subsequent steps. Illustrative non-limiting separation and isolation procedures can be had by reference to the appropriate Examples set forth herein below. Also where pure optical isomer products are desired, such products can be obtained by the use of pure optical isomer starting materials or by resolution of the racemic product or starting materials according to conventional procedures such as, for example, described by Corey et al., *J. Am. Chem. Soc.*, 92, 397 (1970).

Also although the above processes, for purposes of simplicity have been described with respect to methyl ester, methyl ether and acetate protecting groups, other conventional suitable ester and ether protecting groups could, of course, also be used.

The compound of formula I used as starting material in the above described process is prepared in accordance with the method described, for example, by E. J. Corey et al., in *J. Am. Chem. Soc.*, 93, pages 1489, 1490 and 1491 (1971) and references cited therein, as illustrated by the following sequence of reactions:

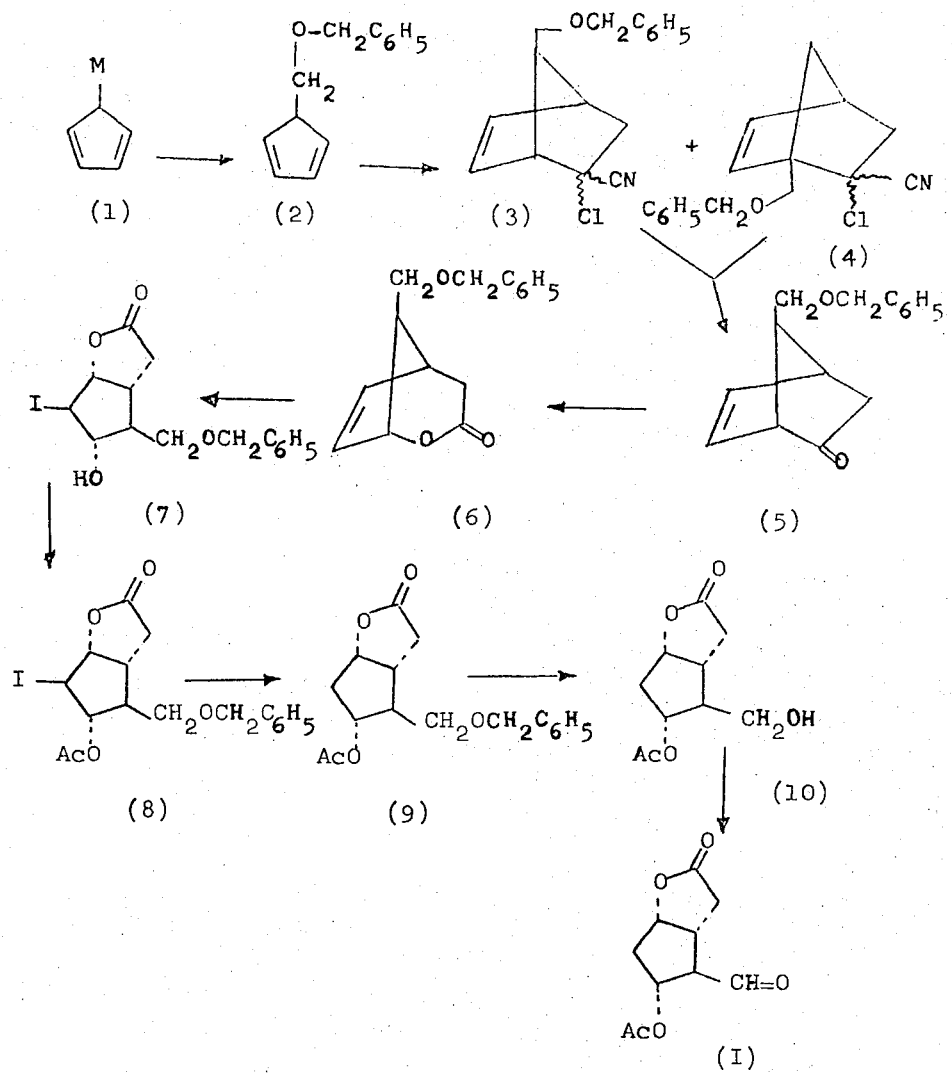

wherein M represents sodium or thallium.

Briefly, this method comprises the reaction of cyclopentadienylsodium or cyclopentadienylthallium (1), obtained by reaction of cyclopentadiene with sodium hydride or aqueous thallous sulfate in the presence of potassium hydroxide (E. J. Corey et al., *J. Am. Chem. Soc.*, 93, page 1489 (1971), with a slight excess of chloromethylbenzyl ether in tetrahydrofuran at approximately −55°C, to yield 5-benzyloxymethyl-1,3-cyclopentadiene (2) which is subjected to the Diels Alder reaction with an excess (about five molar equivalents) of 2-chloroacrylonitrile in the presence of cupric fluoroborate as catalyst to yield a mixture of the endo-exo cyano nitriles of formulas (3) and (4). This mixture of stereoisomeric nitriles is treated with potassium hydroxide in dimethylsulfoxide to yield the anti-bicyclic ketone of formula (5), which upon reaction with a slight molar excess of m-chloroperbenzoic acid in methylene chloride in the presence of sodium bicarbonate results in selective Baeyer-Villiger oxidation to form the corresponding lactone (6), namely 2-oxa-3-oxo-$\Delta^5$-8-syn-benzyloxymethylbicyclo-(3.2.1)-octane. Saponification of the foregoing lactone of formula (6) with 2.5 equivalents of sodium hydroxide in aqueous methanol, followed by neutralization with carbon dioxide and treatment with 2.5 equivalents of aqueous potassium triiodide solution at 0°–5°C produces the hydroxy-iodolactone of formula (7), namely (2'$\alpha$,4'$\alpha$-dihydroxy-3'$\beta$-iodo-5'$\beta$-benzyloxymethylcyclopent-1'$\alpha$-yl) acetic acid 1,2'-lactone, which is esterified with acetic anhydride in pyridine, under conventional conditions to yield the corresponding acetate (8).

This compound is then submitted to deiodination using tri-n-butyl tin hydride in the presence of catalytic amounts of azobisisobutyronitrile in benzene solution, to produce the lactone (9), thence to cleavage of the 5'$\beta$-benzyloxy-methyl group of hydrogenolysis in the presence of palladium-charcoal and perchloric acid as catalysts, in a suitable organic solvent, to produce the hydroxymethyl compound of formula (10), which upon oxidation with chromium trioxide-dipyridine complex [prepared as described by J. C. Collins et al., in *Tetrahedron Letters*, 3363, (1968)] in methylene chloride, at about 0°C affords the desired aldehyde, namely (2'$\alpha$-hydroxy-4'$\alpha$-acetoxy-5'$\beta$-formylcyclopent-1'$\beta$-yl)-acetic acid 1,2'-lactone (I).

The compounds, esters and salts of the invention exhibit prostaglandin-like biological activities and thus are useful in the treatment of mammals where the use of prostaglandins are indicated. The compounds, esters and salts of the invention are bronchodilators and thus are useful in treating mammals for bronchial spasm or wherever strong bronchodilators are indicated. These compounds are also useful in controlling or palliating hypertension in mammals and further exhibit central nervous system depressant activity in mammals, and are useful as sedatives. In addition, the compounds are useful for inducing labor, in pregnancy, and for inducing menses to correct or reduce menstrual abnormalities.

The compounds and/or salts of the invention can be administered in a wide variety of dosage forms, either alone or in combination with other pharmaceutical compatible medicaments, in the form of pharmaceutical compositions suited for oral or parenteral administration or inhalation in the case of bronchodilators. The compounds are typically administered as pharmaceutical compositions consisting essentially of the compounds and/or salts, of the invention, and a pharmaceutical carrier. The pharmaceutical carrier can be either a solid material, liquid or aerosol, in which the compound and/or salt is dissolved, dispersed or suspended, and can optionally contain small amounts of preservatives and/or pH-buffering agents. Suitable preservatives which can be used include, for example, benzyl alcohol and the like. Suitable buffering agents include, for example, sodium acetate and pharmaceutical phosphate salts and the like.

The liquid compositions can, for example, be in the form of solutions, emulsions, suspensions, syrups, or elixirs. The solid compositions can take the form of tablets, powders, capsules, pills or the like, preferably in unit dosage forms for simple administration or precise dosages. Suitable solid carriers include, for example, pharmaceutical grades of starch, lactose, sodium saccharin, talcum, sodium bisulfite and the like.

For inhalation administration, the compounds and/or salts can, for example, be administered as an aerosol comprising the compounds or salts in an inert propellant together with a cosolvent e.g., ethanol, together with optional preservatives and buffering agents. Additional general information concerning the inhalation administration of aerosols can be had by reference to U.S. Pat. No. 2,868,691 and 3,095,355.

The compounds of this invention are typically administered in dosages of about from 0.01 to 10 mg. per kg. of body weight. The precise effective dosage will, of course, vary depending upon the mode of administration, condition being treated and host.

The following Preparations and Examples illustrate the invention, but are not intended to limit its scope. Also, unless expressly stated to the contrary, racemic mixtures are used as starting materials, and correspondingly, racemic mixtures are obtained as products. The abbreviation t.l.c. refers to thin-layer chromatography and all mixtures ratios used with regard to liquids refer to volume ratios. Also, where necessary, preparations and examples are repeated to provide sufficient starting material for subsequent examples.

PREPARATION 1

A. To a stirred solution of 125 g. of thallium sulfate and 50 g. of potassium hydroxide in 750 ml. of water are added, under an atmosphere of argon, 43 ml. of freshly distilled cyclopentadiene and the mixture is vigorously stirred for ten minutes; the yellow precipitate formed is filtered off, washed with ice water, methanol and ether, to yield 132 g. of cyclopentadienylthallium.

B. A mixture of 216.28 g. of benzyl alcohol, 61.44 g. of paraformaldehye, 481.6 g. of anhydrous magnesium sulfate and 1200 ml. of methylene chloride is cooled to a temperature of between −50°C to −55°C in a dry ice-acetonitrile bath, and the stirred cold solution is saturated with anhydrous hydrogen chloride gas. The reaction mixture is kept at −50° to −55°C for ten minutes further, and then the excess of hydrogen chloride is eliminated by passing a stream of nitrogen during 30 minutes. The reaction mixture is filtered and the solid material washed well with pentane, and the combined filtrates are evaporated to dryness at a temperature below 30°C, to produce an oil which is distilled under reduced pressure to yield chloromethyl benzyl ether.

C. A suspension of 132 g. of cyclopentadienyl thallium in 200 ml. of anhydrous ether is cooled to −20°C in a dry ice-carbon tetrachloride bath. To the cooled mixture are added under stirring and under an argon atmosphere, in a 15 minute period, 90 g. of chloromethyl benzyl ether. The reaction mixture is stirred for 3 ½ hours at −20°C, it is then filtered in a filtration flask previously cooled to −78°C and the solid precipitate washed with cold pentane (−78°C).

The filtered solution is immediately added to a mixture of 216 g. of anhydrous α-cyloroacrylonitrile and 30 g. of anhydrous cupric fluoroborate, previously cooled to −78°C. The reaction mixture is evaporated to half its original volume at a temperature not higher than 0°C, and the concentrate is stirred at 0°C for 48 hours. The reaction mixture is then poured into 200 ml. of saturated sodium chloride solution and extracted three times with ether. The combined extracts are washed with saturated sodium bicarbonate solution (2 × 200 ml.) and saturated sodium chloride solution (2 × 200 ml.), dried over magnesium sulfate and evaporated to dryness under reduced pressure. The resulting residue is purified by filtration through 100 g. of silica gel using benzene as eluant, thus obtaining the pure 2-chloro-2-cyano-$\Delta^5$-7-syn-benzyloxymethylbicyclo-(2.2.1)-heptane.

PREPARATION 2

To a stirred solution of 100 g. of 2-chloro-2-cyano-$\Delta^5$-7-syn-benzyloxymethylbicyclo-(2.2.1)-heptane in 368 ml. of dimethylsulfoxide is added dropwise, in a 15 minute period and under an argon atmosphere, a hot solution of 105.2 g. of potassium hydroxide in 52.6 ml. of water. The reaction mixture is stirred for 28 hours at room temperature, diluted to twice its volume with ice water and extracted several times with ether. The combined organic extract is washed twice with saturated sodium carbonate solution, dried over magnesium sulfate and evaporated to dryness. The residue is purified by distillation under high vacuum (0.6 mm.) to yield 7-syn-benzyloxymethyl-2-norbornen-5-one, homogeneous on t.l.c.

PREPARATION 3

To a suspension of 55 g. of m-chloroperbenzoic acid and 43.5 g. of sodium bicarbonate in 570 ml. of anhydrous methylene chloride are added 57 g. of 7-syn-benzyloxymethyl-2-norbornen-5-one, in a 15 minute period and under stirring, maintaining the temperature at about 25°C. The reaction mixture is stirred for three hours further, and diluted with methylene chloride. The resulting mixture is vigorously stirred with 470 ml. of saturated aqueous sodium sulfite solution, the organic layer is separated and washed with saturated sodium sulfite solution. The aqueous phase is extracted with methylene chloride and the combined organic methylene chloride extracts are dried over magnesium sulfate and evaporated to dryness under reduced pressure, thus yielding 2-oxa-3-oxo-$\Delta^5$-8-syn-benzyloxymethylbicyclo-(3.2.1)-octane as an homogeneous oil.

PREPARATION 4

To a solution of 60 g. of 2-oxa-3-oxo-$\Delta^5$-8-syn-benzyloxymethylbicyclo-(3.2.1)-octane in 70 ml. of methanol is added, at 0°C, a solution of 30 g. of sodium hydroxide in 247 ml. of water, and the resulting mixture is stirred at room temperature for three hours. The methanol is then evaporated under vacuo at a temperature below 30°C, cooled to 0°C and extracted with ether to eliminate the unsaponifiable products. The aqueous phase is neutralized with carbon dioxide and immediately treated with a solution of 188.1 g. of iodine and 369 g. of potassium iodide in 275 ml. of water. The reaction mixture is stirred for 48 hours at 0°C and diluted with sodium sulfite solution until complete decoloration. It is then saturated with sodium potassium tartrate and extracted with methylene chloride. The organic extracts are dried over magnesium sulfate and evaporated to dryness under reduced pressure. The oily residue is crystallized from ether-methylene chloride, to yield the pure (2'α,4'α-dihydroxy-3'β-iodo-5'β-benzyloxymethylcyclopent-1'α-yl)-acetic acid 1,2'-lactone.

PREPARATION 5

A mixture of 2.5 g. of (2'α,4'α-dihydroxy-3'β-iodo-5'β-benzyloxymethylcyclopent-1'αyl) acetic acid 1,2'-lactone, 2.5 ml. of pyridine and 5 ml. of acetic anhydride is kept at room temperature for 30 minutes. The solvents are then evaporated under reduced pressure, to yield (2'α-hydroxy-4'α-acetoxy-3'β-iodo-5'β-benzyloxymethylcyclopent-1'α-yl) acetic acid 1,2'-lactone.

PREPARATION 6

To a solution of 61 g. of (2'α-hydroxy-4'α-acetoxy-3'β-iodo-5'β-benzyloxymethylcyclopent-1'α-yl) acetic acid 1,2'-lactone in 610 ml. of benzene (dried over molecular sieves) is added 45.25 g. of tri-n-butyl tin hydride, prepared according to the procedure of H. G. Kuivila and O. F. Beumel, Jr., *J. Am. Chem. Soc.*, 83, 1246 (1961) and 211 mg. of azobisisobutyronitrile. The mixture is stirred at 50°C for 30 minutes, then the benzene is removed by evaporation under reduced pressure, the oily residue is dissolved in 1.5 l. of ether and the ethereal solution is washed several times with 5% aqueous sodium hydroxide solution and then with saturated sodium chloride solution, dried over magnesium sulfate and evaporated under vacuo. The residue is chromatographed on 915 g. of silica gel using as first eluant ether:hexane (1:1) to remove non-polar tin by-products. The fractions eluted with ethyl acetate afford the desired (2'α-hydroxy-4'α-acetoxy-5' β-benzyloxymethylcyclopent-1'α-yl) acetic acid 1,2'-lactone.

PREPARATION 7

To a prehydrogenated suspension of 1 g. of 10% palladium charcoal catalyst in 50 ml. of dimethoxyethane are added 5 g. of (2'α-hydroxy-4'α-acetoxy-5'β-benzyloxymethylcyclopent-1'α-yl) acetic acid 1,2'-lactone and 1.25 ml. of perchloric acid, and the mixture is stirred under hydrogen atmosphere until the absorption of hydrogen ceases. The catalyst is then separated by filtration and washed with ether, and the combined organic filtrates are evaporated to dryness under reduced pressure, to yield (2'α-hydroxy-4'α-acetoxy-5'β-hydroxymethylcyclopent-1'α-yl) acetic acid 1,2'-lactone which is purified by thin-layer chromatography using methylene chloride-ethyl acetate (9:1) as eluant.

PREPARATION 8

To a suspension of 20 g. of Celite, diatomaceous earth (dried for 24 hours at 105°C), and 11.8 g. of chromium trioxidedipyridine complex [prepared as described by J. C. Collins et al. in *Tetrahedron Letters*, 3363 (1968)] in 120 ml. of anhydrous methylene chloride, cooled to −5°C are added under stirring 1.3 g. of (2'α-hydroxy-4'α-acetoxy-5'β-hydroxymethylcyclopent-1'α-yl) acetic acid 1,2'-lactone and the mixture is stirred for ten minutes further, maintaining the temperature between −5°C and 0°C; 40 g. of sodium bisulfite monohydrate are then added and the mixture is stirred for an additional ten minute period, filtered through magnesium sulfate and the solids washed with methylene chloride, receiving the filtrate in a flask cooled to −60°C in a dry ice-acetone bath. The combined filtrates are evaporated to dryness under reduced pressure, at a temperature below 0°C, obtaining (2'α-hydroxy-4' α-acetoxy-5'β-formylcyclopent-1'α-yl) acetic acid 1,2'-lactone as an homogeneous oil.

EXAMPLE 1

A. A solution of 100 g. of dimethyl methylphosphonate in 670 ml. of anhydrous tetrahydrofuran is cooled to −78°C under an argon atmosphere. To the cold solution are added dropwise under stirring and under argon atmosphere, 495 ml. of a 0.1M solution of n-butyllithium in tetrahydrofuran, maintaining the temperature at −70°C. When the addition is complete, the reaction mixture is maintained under the same conditions for ten additional minutes, a solution of 58 ml. of methyl caproate dissolved in 187 ml. of tetrahydrofuran is then carefully added, maintaining the temperature at −78°C. The reaction mixture is stirred at −78°C for 2 hours, followed by stirring for four hours at room temperature. The excess base is neutralized with acetic acid and the solvent is evaporated under high vacuo. The residue is dissolved in ether:water (1:1, 950 ml. each), the ethereal phase is separated, washed with water and dried over magnesium sulfate. The ether is evaporated and the residue is purified by vacuum distillation, thus obtaining the pure dimethyl 2-oxoheptylphosphonate.

In a similar manner but using methyl n-butanoate, methyl n-pentanoate, methyl n-heptanoate, methyl n-octanoate and ethyl n-undecanoate in place of methyl caproate, there are respectively obtained: dimethyl 2-oxopentylphosphonate, dimethyl 2-oxohexylphosphonate, dimethyl 2-oxooctylphosphonate, dimethyl 2-oxononylphosphonate and dimethyl 2-oxododecylphosphonate.

B. To a suspension of 360 mg. of sodium hydride (previously washed with pentane, under argon) in 110 ml. of dimethoxyethane, freshedly distilled from lithium aluminum hydride, is added, under stirring and under an atmosphere of argon, a solution of 1.69 g. of dimethyl 2-oxoheptylphosphonate in 20 ml. of anhydrous dimethoxyethane. The reaction mixture is stirred for 30 minutes at room temperature and 2.38 g. of (2-'α-hydroxy-4'α-acetoxy-5'β-formylcyclopent-1'α-yl) acetic acid 1,2'-lactone dissolved in 40 ml. of dimethoxyethane are added. The reaction mixture is stirred at room temperature for 2 hours further, it is then carefully neutralized with acetic acid (to pH 7) and evaporated to dryness under reduced pressure at a temperature below 30°C. The residue is purified by column chromatography on silica gel, using methylene chloride:diethyl ether (1:1) as eluant, to obtain [2'α-hydroxy-5'-(3''-oxo-oct-1'''(t)-en-1'''-yl)-cyclopent-4'-en-1'α-yl] acetic acid 1,2'-lactone (II, $n=4$) and 2'α-hydroxy-4'α-acetoxy-5'β-(3''-oxo-oct-1'''(t)-en-1'''-yl)-cyclopent-1'α-yl] acetic acid 1,2'-lactone (IIA, $n=4$) and a small amount of dimethyl 2-oxoheptylphosphonate.

To a solution of 500 mg. of [2'α-hydroxy-4'α-acetoxy-5'β-(3''-oxo-oct-1'''(t)-en-1'''-yl)-cyclopent-1'α-yl] acetic acid 1,2'-lactone in 25 ml. of methanol are added 290 mg. of potassium carbonate and the reaction mixture is stirred at room temperature for 2 hours under argon atmosphere. It is added and the organic solution washed with water to neutral, dried and evaporated to dryness under reduced pressure. The residue is purified by chromatography on silica gel, thus obtaining [2'α-hydroxy-5'-(3''-oxo-oct-1'''(t)-en-1''-yl)-cyclopent-4'-en-1'α-yl] acetic acid 1,2'-lactone (II, $n=4$) and a small amount of recovered starting material.

By the same method but using dimethyl-2-oxopentylphosphonate, dimethyl-2-oxohexylphosphonate, dimethyl-2-oxooctylphosphonate, dimethyl-2-oxononylphosphonate and dimethyl-2-oxododecylphosphonate in lieu of dimethyl-2-oxoheptylphosphonate there are respectively obtained as main products:

[2'α-hydroxy-5'-(3''-oxohex-1''(t)-en-1''-yl)-cyclopent-4'-en-1'α-yl] acetic acid 1,2'-lactone,
[2'α-hydroxy-5'-(3''-oxohept-1''(t)-en-1''-yl)-cyclopent-4'-en-1'α-yl] acetic acid 1,2'-lactone,
[2'α-hydroxy-5'-(3''-oxonon-1''(t)-en-1''-yl)-cyclopent-4'-en-1'α-yl] acetic acid 1,2'-lactone,
[2'α-hydroxy-5'-(3''-oxodec-1''(t)-en-1''-yl)-cyclopent-4'-en-1'α-yl] acetic acid 1,2'-lactone and
[2'α-hydroxy-5'-(3''-oxotridec-1''(t)-en-1''-yl)-cyclopent-4'-en-1'α-yl] acetic acid 1,2'-lactone.

EXAMPLE 2

To a stirred solution of 6.43 g. of [2'α-hydroxy-5'-(3''-oxo-oct-1'''(t)-en-1'''-yl)-cyclopent-4'-en-1'α-yl] acetic acid 1,2'-lactone in 50 ml. of dimethoxyethane, freshly distilled from lithium aluminum hydride are added 10.8 ml. of zinc borohydride reagent in anhydrous dimethoxyethane. The reaction mixture is stirred for an additional hour at room temperature, and treated with a saturated solution of sodium bitartrate until the evolution of gas ceases. It is then diluted with methylene chloride, dried over magnesium sulfate and evaporated to dryness under vacuum at a temperature below 30°C, to yield [2'α-hydroxy-5'-(3''α-hydroxyoct-1'''(t)-en-1'''-yl)-cyclopent-4'-en-1'α-yl] acetic acid 1,2'-lactone in mixture with the 3''β-hydroxy isomer (III, $n=4$).

This oily mixture is separated into the individual isomers by thin-layer chromatography using a mixture of hexane:ethyl acetate (60:40) as eluant.

In a similar manner, the remaining oxo compounds obtained in Example 1 are converted respectively into [2'α-hydroxy-5'-(3''ξ-hydroxyhex-1''(t)-en-1''-yl)-cyclopent-4'-en-1'α-yl] acetic acid 1,2'-lactone,
[2'α-hydroxy-5'-(3''ξ-hydroxyhept-1''(t)-en-1''-yl)-cyclopent-4'-en-1'α-yl] acetic acid 1,2'-lactone,
[2'α-hydroxy-5'-(3''ξ-hydroxynon-1''(t)-en-1''-yl)-cyclopent-4'-en-1'α-yl] acetic acid 1,2'-lactone,
[2'α-hydroxy-5'-(3''ξ-hydroxydec-1''(t)-en-1''-yl)-cyclopent-4'-en-1'α-yl] acetic acid 1,2'-lactone and
[2'α-hydroxy-5'-(3''ξ-hydroxytridec-1''(t)-en-1''-yl)-cyclopent-4'-en-1'α-yl] acetic acid 1,2'-lactone,
which are separated into the individual 3''α- and 3''β-hydroxy isomers by thin-layer chromatography.

The zinc borohydride reagent is prepared from 0.025 mol of fused zinc chloride and 0.050 mol of sodium borohydride in 50 ml. of dimethoxyethane, stirring the mixture for 16 hours and filtering the insoluble material under argon atmosphere.

EXAMPLE 3

One gram of [2'α-hydroxy-5'-(3''α-hydroxyoct-1'''(t)-en-1'''-yl)-cyclopent-4'-en-1'α-yl] acetic acid 1,2'-lactone is dissolved in 50 ml. of anhydrous toluene. The solution is cooled to −60°C and to the cold solution is added a solution of 2 molar equivalents of diisobutylaluminum hydride in 3.6 ml. of anhydrous toluene, stirring the reaction mixture for 2 hours at −60°C. It is then diluted with methanol until the evolution of gas ceases, the mixture is stirred for 15 minutes further at room temperature and diluted with ether. The organic phase is then separated, washed with saturated sodium chloride solution, dried over magnesium sulfate and evaporated to dryness at about 0°C to produce [2'α-hydroxy-5'-(3''α-hydroxyoct-1'''(t)-en-1'''-yl)-cyclopent-4'-en-1'α-yl] -acetaldehyde 1,2'-hemiacetal (IV, $n=4$).

By the same method, starting from the corresponding [2'α-hydroxy-5'-(3''α-hydroxyalk-1'''(t)-en-1'''-yl)-cyclopent-4'-en-1'α-yl] acetic acid 1,2'-lactone obtained as described in Example 2, there are produced:

[2'α-hydroxy-5'-(3''α-hydroxyhex-1'''(t)-en-1'''-yl)-cyclopent-4'-en-1'α-yl]-acetaldehyde 1,2'-hemiacetal,

[2'α-hydroxy-5'-(3''α-hydroxyhept-1'''(t)-en-1'''-yl)-cyclopent-4'-en-1'α-yl]-acetaldehyde 1,2'-hemiacetal,

[2'α-hydroxy-5'-(3''α-hydroxynon-1'''(t)-en-1'''-yl)-cyclopent-4'-en-1'α-yl]-acetaldehyde 1,2'-hemiacetal,

[2'α-hydroxy-5'-(3''α-hydroxydec-1'''(t)-en-1'''-yl)-cyclopent-4'-en-1'α-yl]-acetaldehyde 1,2'-hemiacetal and

[2'α-hydroxy-5'-(3''α-hydroxytridec-1'''(t)-en-1'''-yl)-cyclopent-4'-en-1'α-yl]-acetaldehyde 1,2'-hemiacetal.

EXAMPLE 4

A stirred suspension of 440 mg. of sodium hydride in 5 ml. of anhydrous dimethylsulfoxide is heated to 80°C for half an hour under an argon atmosphere. 1.4 ml. of the resulting solution are added to a solution of 640 mg. of dried 5-triphenylphosphoniopentanoic acid in 1.5 ml. of anhydrous dimethylsulfoxide, under an argon atmosphere and under stirring. The reaction mixture is stirred for 5 minutes, 100 mg. of [2'α-hydroxy-5'-(3''α-hydroxy-oct-1'''(t)-en-1'''-yl)-cyclopent-4'-en-1'α-yl]-acetaldehyde 1,2'-hemiacetal dissolved in 1 ml. of dimethylsulfoxide is added, and the reaction mixture is stirred at room temperature for 18 hours. The solvent is then evaporated under reduced pressure at a temperature below 35°C and the residue is dissolved in 10 ml. of water. The neutral products are extracted with ethyl acetate:ether (1:1) (4 × 4 ml.). The aqueous phase is acidified with saturated aqueous oxalic acid solution to pH 2, and extracted several times with a mixture of pentane:diethyl ether (1:1). The combined organic extracts are washed with saturated sodium chloride solution, dried over magnesium sulfate and evaporated to dryness at a temperature not higher than 20°C. Purification of the residue by t.l.c. using chloroform:methanol (9:1) as eluant, affords the pure 9α,15α-dihydroxyprosta-5-cis,11,13-trans-trienoic acid (V, $n=4$).

By repeating the above procedure with the remaining lactols obtained in Example 3 as starting compounds, there are respectively produced:

9α,15α-dihydroxy-20-bisnorprosta-5-cis,11,13-trans-trienoic acid,

9α,15α-dihydroxy-20-norprosta-5-cis,11,13-trans-trienoic acid,

9α,15α-dihydroxy-20-methylprosta-5-cis,11,13-trans-trienoic acid,

9α,15α-dihydroxy-20-ethylprosta-5-cis,11,13-trans-trienoic acid and

9α,15α-dihydroxy-20-pentylprosta-5-cis,11,13-trans-trienoic acid.

The 5-triphenylphosphoniopentanoic acid used as reagent is prepared by reflux of a mixture of 9.5 g. of 5-bromopentanoic acid, 14.4 g. of triphenylphosphine and 100 ml. of acetonitrile for about 70 hours. The insoluble material is separated by filtration and the filtrate is concentrated to a small volume. The produce is crystallized by addition of ether, and is further purified by two subsequent recrystallizations from acetonitrile-ether.

EXAMPLE 5

A. To a solution of 250 mg. of [2'α-hydroxy-5'-(3''α-hydroxyoct-1'''(t)-en-1'''-yl)-cyclopent-4'-en-1'α-yl]-acetaldehyde 1,2'-hemiacetal in 5 ml. of anhydrous methanol is added 5 mg. of p-toluenesulfonic acid and the reaction mixture is stirred for 15 minutes at room temperature. It is then evaporated to dryness under reduced pressure and the residue dissolved in ethyl acetate. The organic solution is washed with 10% sodium carbonate solution and saturated sodium chloride solution, dried over magnesium sulfate and evaporated to dryness under vacuum to yield [2'α-hydroxy-5'-(3''α-hydroxyoct-1'''(t)-en-1'''-yl)-cyclopent-4'-en-1'-yl]-acetaldehyde 1,2'-hemiacetal methyl ether (VI, $R^5 = H$, $n=4$).

B. A mixture of 265 mg. of [2'α-hydroxy-5'-(3''α-hydroxy-oct-1'''(t)-en-1'''-yl]-cyclopent-4'-en-1'-yl]-acetaldehyde 1,2'-hemiacetal methyl ether, 1 ml. of acetic anhydride and 0.265 ml. of pyridine is stirred at room temperature for 30 minutes, at the end of which time the t.l.c. analysis demonstrates the absence of starting compound. The reaction mixture is evaporated to dryness under vacuo, to afford [2'α-hydroxy-5'-(3''α-acetoxyoct-1'''(t)-en-1'''-yl)-cyclopent-4'-en-1'-yl]-acetaldehyde 1,2'-hemiacetal methyl ether (VI, $R^5$ = acetyl, $n=4$).

Likewise, the other lactols obtained in Example 3 are converted into the corresponding methyl ether-acetates, namely:

[2'α-hydroxy-5'-(3''α-acetoxyhex-1'''(t)-en-1'''-yl)-cyclopent-4'-en-1'-yl]-acetaldehyde 1,2'-hemiacetal methyl ether,

[2'α-hydroxy-5'-(3''α-acetoxyhept-1'''(t)-en-1'''-yl)-cyclopent-4'-en-1'-yl]-acetaldehyde 1,2'-hemiacetal methyl ether,

[2'α-hydroxy-5'-(3''α-acetoxynon-1'''(t)-en-1'''-yl)-cyclopent-4'-en-1'-yl]-acetaldehyde 1,2'-hemiacetal methyl ether,

[2'α-hydroxy-5'-(3''α-acetoxydec-1'''(t)-en-1'''-yl)-cyclopent-4'-en-1'-yl]-acetaldehyde 1,2'-hemiacetal methyl ether and

[2'α-hydroxy-5'-(3''α-acetoxytridec-1'''(t)-en-1'''-yl)-cyclopent-4'-en-1'-yl]-acetaldehyde 1,2'-hemiacetal methyl ether.

EXAMPLE 6

A solution of 250 mg. of [2'α-hydroxy-5'-(3"α-acetoxyoct-1"(t)-en-1"-yl)-cyclopent-4'-en-1'-yl]-acetaldehyde 1,2'-hemiacetal methyl ether in 10 ml. of 0.03N hydrochloric acid in acetonitrile is stirred at room temperature for 30 minutes. The reaction mixture is then evaporated to dryness under reduced pressure, the oily residue is dissolved in ethyl acetate and the organic solution washed with 10% aqueous sodium bicarbonate solution and saturated sodium chloride solution, dried over magnesium sulfate and evaporated to dryness under vacuo, to yield [2'α-hydroxy-5'-(3"α-acetoxyoct-1"(t)-en-1"-yl)-cyclopent-4'-en-1'-yl]-acetaldehyde 1,2'-hemiacetal.

In a similar manner the remaining methyl ether compounds obtained in Example 5 are hydrolyzed to the corresponding free lactols.

EXAMPLE 7

In accordance with the method of Example 4, 250 mg. of [2'α-hydroxy-5'-(3"α-acetoxyoct-1"(t)-en-1"-yl)-cyclopent-4'-en-1'-yl]-acetaldehyde 1,2'-hemiacetal are treated with the sodium anion of 5-triphenylphosphoniopentanoic acid to produce 9α-hydroxy-15α-acetoxyprosta-5-cis,11,13-trans-trienoic acid (VII, $n=4$).

Similarly but using
[2'α-hydroxy-5'-(3"α-acetoxyhex-1"(t)-en-1"-yl)-cyclopent-4'-en-1'α-yl]-acetaldehyde 1,2'-hemiacetal,
[2'α-hydroxy-5'-(3"α-acetoxyhept-1"(t)-en-1"-yl)-cyclopent-4'-en-1'α-yl]-acetaldehyde 1,2'-hemiacetal,
[2'α-hydroxy-5'-(3"α-acetoxynon-1"(t)-en-1"-yl)cyclopent-4'-en-1'α-yl]-acetaldehyde 1,2'-hemiacetal,
[2'α-hydroxy-5'-(3"α-acetoxydec-1"(t)-en-1"-yl)-cyclopent-4'-en-1'α-yl]-acetaldehyde 1,2'-hemiacetal, and
[2'α-hydroxy-5'-(3"α-acetoxytridec-1"(t)-en-1"-yl)-cyclopent-4'-en-1'α-yl]-acetaldehyde 1,2'-hemiacetal as starting materials there are respectively obtained:
9α-hydroxy-15α-acetoxy-20-bisnorprosta-5-cis,11,13-trans-trienoic acid,
9α-hydroxy-15α-acetoxy-20-norprosta-5-cis,11,13-trans-trienoic acid,
9α-hydroxy-15α-acetoxy-20-methylprosta-5-cis,11,13-trans-trienoic acid,
9α-hydroxy-15α-acetoxy-20-ethylprosta-5-cis,11,13-trans-trienoic acid and
9α-hydroxy-15α-acetoxy-20-pentylprosta-5-cis,11,13-trans-trienoic acid.

EXAMPLE 8

A solution of 100 mg. of 9α-hydroxy-15α-acetoxyprosta-5-cis,11,13-trans-trienoic acid in 4 ml. of purified acetone is cooled to −10°C and treated under an atmosphere of nitrogen and with stirring, with 0.15 ml. of an 8N solution of chromic acid (prepared by mixing 26 g. of chromium trioxide with 23 ml. of concentrated sulfuric acid and diluting with water to 100 ml.). The reaction mixture is stirred for 30 minutes further at −10°C, 0.15 ml. of isopropanol are then added to destroy the excess reagent, and the mixture diluted with ethyl acetate. The solution is immediately washed three times with sodium chloride solution, dried over magnesium sulfate and evaporated to dryness under reduced pressure, to give 9-keto-15α-acetoxyprosta-5-cis,11,13-trans-trienoic acid (VIII, $R^5$ = acetyl, $n=4$), which is purified by t.l.c. using chloroform:methanol (9:1) as eluant.

In a similar manner, the remaining 9α-hydroxy prostatrienoic acid compounds obtained in Example 7 are converted into the corresponding 9-keto derivatives.

EXAMPLE 9

A mixture of 90 mg. of 9-keto-15α-acetoxyprosta-5-cis,11,13-trans-trienoic acid, 1.8 g. of dry, finely ground freshly extracted residue of the gorgonian *Plexaura homomalla* (Esper), [which results after extraction of the prostaglandin derivatives contained originally by this gorgonian, as described by A. Prince et al., in *Prostaglandins*, Vol. 3, No. 4, p. 531 (1973)] and 10 ml. of a 0.1M sodium chloride and 0.05M calcium chloride solution in water is stirred at room temperature for 24 hours, maintaining the pH of the reaction mixture at 7.5–7.7 by addition of 0.1N sodium hydroxide solution. At the end of this time the reaction mixture is diluted with 15 ml. of acetone, adjusting the pH to 4 with dilute hydrochloric acid. Charcoal is added to decolorize the solution, and the insoluble material separated by filtration through Celite, diatomaceous earth, washing the solids with several portions of acetone. The combined filtrates are concentrated under reduced pressure to a small volume, and the product extracted from the aqueous residue with methylene chloride. The combined organic extracts are dried over magnesium sulfate and evaporated to dryness under reduced pressure. The oily residue is purified by t.l.c., thus obtaining the pure 9-keto-15α-hydroxyprosta-5-cis,11,13-trans-trienoic acid (VIII, $R^5$ = H, $n=4$).

In a similar manner, starting from the corresponding 9-keto-15α-acetoxy compounds obtained in accordance with the method of Example 8, there are produced:
9-keto-15α-hydroxy-20-bisnorprosta-5-cis,11,13-trans-trienoic acid,
9-keto-15α-hydroxy-20-norprosta-5-cis,11,13-trans-trienoic acid,
9-keto-15α-hydroxy-20-methylprosta-5-cis,11,13-trans-trienoic acid,
9-keto-15α-hydroxy-20-ethylprosta-5-cis,11,13-trans-trienoic acid and
9-keto-15α-hydroxy-20-pentylprosta-5-cis,11,13-trans-trienoic acid.

EXAMPLE 10

To a solution of 100 mg. of 9α,15α-dihydroxyprosta-5-cis, 11,13-trans-trienoic acid in 5 ml. of ether is added 1 ml. of an ethereal solution of diazomethane, and the reaction mixture is maintained at room temperature for 10 minutes. The solvents and excess reagent are eliminated by vacuum distillation and the residue is purified by t.l.c. to afford 9α,15α-dihydroxyprosta-5-cis,11,13-trans-trienoic acid methyl ester (VA, $R^{4'}$ = Me, $n=4$).

In a similar manner but using diazoethane or diazopropane in place of diazomethane, the ethyl and propyl esters of 9α,15α-dihydroxyprosta-5-cis,11,13-trans-trienoic acid are obtained.

Likewise the other prostatrienoic acid compounds obtained in Example 4, 8 and 9 are converted into the corresponding methyl and ethyl esters. Representative compounds thus obtained are:

9α, 15α-dihydroxy-20-bisnorprosta-5-cis,11,13-trans-trienoic acid methyl ester,

9α,15α-dihydroxy-20-methylprosta-5-cis,11,13-trans-trienoic acid methyl ester,

9α,15α-dihydroxy-20-ethylprosta-5-cis,11,13-trans-trienoic acid methyl ester,

9α,15α-dihydroxy-20-ethylprosta-5-cis11,13-trans-trienoic acid ethyl ester,

9α,15α-dihydroxy-20-norprosta-5-cis,11,13-trans-trienoic acid propyl ester, 9-keto-15α-hydroxyprosta-5-cis,11,13-trans-trienoic acid methyl ester, 9-keto-15α-hydroxy-20-bisnorprosta-5-cis,11,13-trans-trienoic acid methyl ester, 9-keto-15α-hydroxy-20-norprosta-5-cis,11,13-trans-trienoic acid ethyl ester, 9-keto-15α-hydroxy-20-ethylprosta-5-cis,11,13-trans-trienoic acid methyl ester, 9-keto-15α-hydroxy-20-pentylprosta5-cis,11,13-trans-trienoic acid ethyl ester, 9-keto-15α-acetoxyprosta-5-cis,11,13-trans-trienoic acid methyl ester and 9-keto-15α-acetoxyprosta-20-ethylprosta-5-cis,11,13-trans-trienoic acid ethyl ester.

EXAMPLE 11

To a solution of 300 mg. of 9-keto-15α-hydroxyprosta-5-cis,11,13-trans-trienoic acid methyl ester in 5 ml. of methanol, cooled to 0°C, are added 160 mg. of sodium borohydride, and the reaction mixture is stirred for 30 minutes at room temperature. The solvent is then eliminated under reduced pressure, water is added and the product extracted with ethyl acetate. The organic extract is washed with dilute hydrochloric acid solution and water to neutral, dried over magnesium sulfate and evaporated to dryness under reduced pressure. The residue is purified by chromatography on silica gel using methylene chloride-ethyl acetate mixtures, to thus obtain 9α,15α-dihydroxyprosta-5-cis,11,13-trans-trienoic acid methyl ester and 9β,15-α-dihydroxyprosta-5-cis,11,13-trans-trienoic acid methyl ester (VA, R$^{4'}$ = Me, $n$=4) in pure form, in approximately equal amounts.

In a similar manner from the corresponding 9-keto compounds there are obtained:

9α, 15α-dihydroxy-20-bisnorprosta-5-cis,11,13-trans-trienoic acid methyl ester and 9β,15α-dihydroxy-20-bisnorprosta-5-cis,11,13-trans-trienoic acid methyl ester;

9α,15α-dihydroxy-20-ethylprosta-5-cis,11,13-trans-trienoic acid methyl ester and 9β,15α-dihydroxy-20-ethylprosta-5-cis,11,13-trans-trienoic acid methyl ester and 9α,15α-dihydroxy-20-pentylprosta-5-cis,11,13-trans-trienoic acid ethyl ester and 9β,15α-dihydroxy-20-pentylprosta-5-cis,11,13-trans-trieonic acid ethyl ester.

EXAMPLE 12

A. A mixture of 1.5 g. of 9α,15α-dihydroxyprosta-5-cis,11,13-trans-trienoic acid methyl ester, 50 ml. of dioxane and 3 g. of 2,3-dichloro-5,6-dicyano-1,4-benzoquinone is stirred at 50°C for 18 hours. The reaction mixture is then evaporated to dryness under reduced pressure and the residue is dissolved in methylene chloride and chromatographed on silica gel. The fractions eluted with methylene chloride:ethyl acetate (95:5) afford 9α-hydroxy-15-ketoprosta-5-cis,11,13-trans-trienoic acid methyl ester (IX, $n$=4) in pure form.

B. To a solution of 750 mg. of 9α,15α-dihydroxyprosta-5-cis,11,13-trans-trienoic acid methyl ester in 15 ml. of anhydrous tetrahydrofuran are added 3 g. of activated manganese dioxide, and the reaction mixture is stirred at room temperature for 6 hours, the manganese dioxide is filtered off and washed with acetone and the combined filtrates are evaporated to dryness under reduced pressure. The residue is redissolved in tetrahydrofuran and stirred with another 3 g. batch of manganese dioxide as above, repeating the operation twice. After final evaporation of the solvent and purification of the residue by chromatography on Florisil there is obtained the pure 9α-hydroxy-15-ketoprosta-5-cis,11,13-trans-trienoic acid methyl ester, identical to that obtained in part A.

Similarly, by following the methods of part A or B of this Example, from the corresponding 9α (or β) 15α-dihydroxyprosta-trienoic acid esters there are obtained:

9α-hydroxy-15-keto-20-bisnorprosta-5-cis,11,13-trans-trienoic acid methyl ester, 9α-hydroxy-15-keto-20-methylprosta-5-cis,11,13-trans-trienoic acid methyl ester, 9α-hydroxy-15-keto-20-ethylprosta-5-cis,11,13-trans-trienoic acid methyl ester, 9β-hydroxy-15-ketoprosta-5-cis,11,13-trans-trienoic acid methyl ester, 9β-hydroxy-15-keto-20-ethylprosta-5-cis,11,13-trans-trienoic acid methyl ester and 9β-hydroxy-15-keto-20-pentylprosta-5-cis,11,13-trans-trienoic acid ethyl ester.

EXAMPLE 13

A solution of 60.5 mg. of 9α-hydroxy-15-ketoprosta-5-cis,11,13-trans-trienoic acid methyl ester in 20 ml. of anhydrous ether is cooled to −20°C and treated dropwise, under stirring and under argon atmosphere with 3ml. of 3N methylmagnesium bromide solution in ether. The temperature of the reaction mixture is allowed to rise to 0°C, 6 additional molar equivalents of methylmagnesium bromide solution are added and the resulting mixture is stirred for 2 hours more, at the end of which time here are added 5 ml. of methanol. The resulting mixture is diluted with ether and washed several times with saturated sodium chloride solution. The ethereal extract is then dried over magnesium sulfate and evaporated to dryness under reduced pressure. The oily residue is purified by thin-layer chromatography, using methylene chloride:ethyl acetate (80:20) as gradient to produce 15β-methyl-9α, 15α-dihydroxyprosta-5-cis,11,13-trans-trienoic acid methyl ester and 15α-methyl-9α,15β-dihydroxyprosta-5-cis,11,13-trans-trienoic acid methyl ester (X, R$^3$ = R$^{4'}$ = Me, $n$=4) in pure form.

In a similar manner but using ethylmagnesium bromide and propylmagnesium bromide in place of methylmagnesium bromide, there are obtained 15β-ethyl-9α,15α-dihydroxyprosta-5-cis,11,13-trans-trienoic acid methyl ester and 15β-propyl-9α,15α-dihydroxyprosta-5-cis,11,13-trans-trienoic acid methyl ester, in mixture with the corresponding 15α-alkyl-15β-hydroxy isomers.

By the same method the remaining 15-keto compounds obtained in Example 12 are converted into the corresponding 15ξ-methyl (ethyl, propyl) 15ξ-hydroxy derivatives. Representative compounds thus obtained are:

15β-methyl9α, 15α-dihydroxy-20-bisnorprosta-5-cis,11,13-trans-trienoic acid methyl ester,
15β-ethyl-9α,15α-dihydroxy-20-methylprosta-5-cis,11,13-trans-trienoic acid methyl ester,
9α, 15α-dihydroxy-15β20 -diethylprosta-5-cis,11,13-trans-trienoic acid methyl ester,
15β-propyl-9α,15α-dihydroxy-20-ethylprosta-5-cis,11,13-trans-trienoic acid methyl ester,
15β-methyl-9β,15α-dihydroxyprosta-5-cis,11,13-trans-trienoic acid methyl ester,
15β-methyl-9β,15α-dihydroxy-20-ethylprosta-5-cis,11,13-trans-trienoic acid methyl ester and
15β-methyl-9β,15α-dihydroxy-20-pentylprosta-5-cis,11,13-trans-trienoic acid ethyl ester, as well as the corresponding 15α-alkyl-15β-hydroxy isomers.

EXAMPLE 14

To a suspension of 2 g. of Celite, diatomaceous earth (dried for 24 hours at 105°C), and 1 g. of chromium trioxide-dipyridine complex [prepared as described by J. C. Colline et al., in *Tetrahedron Letters*, 3363 (1968)] in 15 ml. of methylene chloride cooled to −5°C is added, under stirring, a solution of 130 mg. of 15β-methyl-9α,15α-dihydroxyprosta-5-cis,11,13-trans-trienoic acid methyl ester in 5 ml. of methylene chloride and the mixture is stirred for 15 minutes further at 0°–5°C; 300 mg. of sodium bisulfate monohydrate are then added and the reaction mixture is stirred for an additional 10 minute period. The insoluble material is separated by filtration and washed well with methylene chloride. The combined organic filtrates are evaporated to dryness under vacuum and the residue purified by thin-layer chromatography, thus obtaining the pure 9-keto-15β-methyl-15α -hydroxyprosta-5-cis,11,13-trans-trienoic acid methyl ester (XI, $R^3 = R^4 = Me$, n=4).

Similarly, 15β-methyl-9α,15α-dihydroxy-20-bisnorprosta-5-cis,11,13-trans-trienoic acid methyl ester, 15β-methyl-9α,15α-dihydroxy-20-ethylprosta-5-cis,11,13-trans-trienoic acid methyl ester, 15β-ethyl-9α,15α-dihydroxyprosta-5-cis,11,13-trans-trienoic acid methyl ester, 15β-propyl-9α,15α-dihydroxyprosta-5-cis,11,13-trans-trienoic acid methyl ester, 9α,15α-dihydroxy-15β,20-diethylprosta-5-cis,11,13-trans-trienoic acid methyl ester and 15β-methyl-9β,15α-dihydroxy-20-pentylprosta-5-cis,11,13-trans-trienoic acid ethyl ester are converted into the corresponding 9-keto compounds.

EXAMPLE 15

A. A suspension of 4 g. of crude pancreatic lipase (Sigma L-3126) in 40ml. of a 0.1 M sodium chloride and 0.05M calcium chloride solution in water is stirred at 25°C for 1 hour. The mixture is then centrifuged for one hour at 5000 rev./min. and at 25° to 30°C. The supernatant is neutralized with 1N sodium hydroxide solution to pH 7.2 to 7.4 and used directly for the hydrolysis of the prostaglandin derivatives of the invention.

B. Forty-two milligrams of 9-keto-15β-methyl-15α-hydroxyprosta-5-cis,11,13-trans-trienoic acid methyl ester are dissolved by sonication at 37°C for 20 minutes in 30 ml. of the lipase solution prepared as described in part A. The reaction mixture is magnetically stirred for 15 minutes at 25° to 26°C, adjusting constantly to pH to 7.2–7.4 during the reaction period with 1N sodium hydroxide solution. The reaction mixture is then acidified to pH 2.5 using a 0.2N hydrochloric acid solution and the product extracted several times from the solution with ethyl acetate and ether. The combined organic extracts are dried over magnesium sulfate and evaporated to dryness under vacuum. The residue is dissolved in methylene chloride and chromatographed on 3 g. of florisil using ether containing increasing percentages of ethyl acetate to elute the column, thus obtaining the pure 9-ketone-15β-methyl-15α-hydroxyprosta-5-cis,11,13-trans-trienoic acid (XI, $R^3$ = Me, $R^4$ = H, n =4).

By the same method, starting from the corresponding alkyl ester compounds obtained in Examples 11, 13 and 14 there are produced the following compounds:

9β,15α-dihydroxyprosta-5-cis,11,13-trans-trienoic acid,
9β,16α-dihydroxy-20-ethylprosta-5-cis,11,13-trans-trienoic acid,
9β,15α-dihydroxy-20-pentylprosta-5-cis,11,13-trans-trienoic acid,
15β-methyl-9α,15α-dihydroxyprosta-5-cis,11,13-trans-trienoic acid,
15β-propyl-9α, 15α-dihydroxy-20-ethylprosta-5-cis,11,13-trans-trienoic acid,
9-keto-15β-methyl-15α-hydroxy-20-bisnorprosta-5-cis,11,13-trans-trienoic acid,
9-keto-15α-hydroxy-15β,20-diethylprosta-5-cis,11,13-trans-trienoic acid,
9-keto-15β-methyl-15α-hydroxy-20-ethylprosta-5-cis,11,13-trans-trienoic acid,
9-keto-15β-ethyl-15α-hydroxyprosta-5-cis,11,13-trans-trienoic acid,
9-keto-15β-propyl-15α-hydroxyprosta-5-cis,11,13-trans-trienoic acid,
9-keto-15α-methyl-15β-hydroxyprosta-5-cis,11,13-trans-trienoic acid,
9-keto-15β-methyl-15α-hydroxy-20-pentylprosta-5-cis,11,13-trans-trienoic acid,
15β-methyl-9α,15α-dihydroxy-20-bisnorprosta-5-cis,11,13-trans-trienoic acid,
15β-ethyl-9α,15α-dihydroxy-20-methylprosta-5-cis,11,13-trans-trienoic acid,
9α,15α-dihydroxy-15β,20-diethylprosta-5-cis,11,13-trans-trienoic acid,
15β-methyl-9β,15α-dihydroxyprosta-5-cis,11,13-trans-trienoic acid,
15β-methyl-9β,15α-dihydroxy-20-ethylprosta-5-cis,11,13-trans-trienoic acid and
15β-methyl-9β,15α-dihydroxy-20-pentylprosta-5-cis,11,13-trans-trienoic acid.

EXAMPLE 16

A mixture of 100 mg. of 9α,15α-dihydroxyprosta-5-cis,11,13-trans-trienoic acid, 0.4 ml. of pyridine and 0.8 ml. of acetic anhydride is kept at room temperature for one hour. The reaction mixture is then evaporated to dryness under reduced pressure and the residue is dissolved in ethyl acetate, 50 mg. of sodium bisulfate are added and the solution is filtered through diatomaceous earth. The filtrate is evaporated to dryness to yield 9α,15α-diacetoxyprosta-5-cis,11,13-trans-trienoic acid.

By the same process by using propionic, caproic and cyclopentylpropionic anhydrides as esterifying agents there are respectively obtained the 9α,15α-dipropionoxy,9α,15α-dicaproxy, and 9α,15α-dicyclopentylpropionoxy- derivatives of prosta-5-cis,11,13-trans-trienoic acid.

In a similar manner, 9-keto-15α-hydroxyprosta-5-cis,11,13-trans-trienoic acid and 9-keto-15α-hydroxy-20-ethylprosta-5-cis,11,13-trans-trienoic acid are respectively converted into the corresponding 15-propionates, 15-caproates and 15-cyclopentylpropionates.

EXAMPLE 17

To a solution of 100 mg. of 9α,15α-dihydroxyprosta-5-cis,11,13-trans-trienoic acid in 10 ml. of methanol is added 3 ml. of a 0.1N solution of sodium hydroxide, and the top mixture evaporated to dryness under reduced pressure, to give the sodium salt of 9α,15α-dihydroxyprosta-5-cis,11,13-trans-trienoic acid.

By employing 1.1 molar equivalents of potassium hydroxide (in the form of a 0.1N solution) in place of sodium hydroxide in the above procedure, the potassium salt of 9α,15α-dihydroxyprosta-5-cis,11,13-trans-trienoic acid is obtained.

Similarly, the sodium and potassium salts of the other prostanoic acid derivatives obtained in the previous Examples are produced.

EXAMPLE 18

To a solution of 100 mg. of 9α,15α-dihydroxyprosta-5-cis,11,13-trans-trienoic acid in 10 ml. of methanol is added a mixture of 3 ml. of concentrated ammonium hydroxide solution and 5 ml. of methanol. The resulting mixture is stirred for 30 minutes at room temperature and then evaporated to dryness, to yield the ammonium salt of 9α,15α-dihydroxyprosta-5-cis,11,13-trans-trienoic acid.

By employing dimethylamine, diethylamine or dipropylamine in place of ammonium hydroxide in the above process, the corresponding salts of 9α,15α-dihydroxyprosta-5-cis,11,13-trans-trienoic acid are obtained.

In a similar manner, the ammonia, dimethylamine, diethylamine and dipropylamine salts of 9α,15α-dihydroxy-20-ethylprosta-5-cis,11,13-trans-trienoic acid, 9-keto-15α-hydroxyprosta-5-cis,11,13-trans-trienoic acid and 9β,15α-dihydroxyprosta-5-cis,11,13-trans-trienoic acid are respectively prepared.

EXAMPLE 19

To a solution of 200 mg. of 9α,15α-dihydroxyprosta-5-cis,11,13-trans-trienoic acid methyl ester in 2 ml. of methylene chloride are added 5 mg. of p-toluenesulfonic acid and 0.4 ml. of freshly distilled dihydropyran. The reaction mixture is stirred for 2 hours at room temperature, a few drops of pyridine are added and diluted with ether. The etheral solution is washed with 50% saturated aqueous sodium chloride solution and then with saturated sodium chloride solution, dried over magnesium sulfate and evaporated to dryness under reduced pressure, at approximately 0°C. The oily residue is purified by thin-layer chromatograpy, to produce the pure 9α,15α-bistetrahydropyran-2'-yloxyprosta-5-cis, 11, 13-trans-trienoic acid methyl ester.

Upon hydrolysis of the methyl ester group in accordance with the method of Example 15, there is obtained 9α,15α-bistetra-hydropyran-2'-yloxyprosta-5-cis,11,13-trans-trienoic acid.

In a similar manner but using dihydrofuran and 4-methoxydihydropyran in place of dihydropyran in the above procedure there are respectively obtained 9α, 15α-bistetrahydrofuran-2'-yloxyprosta-5-cis, 11, 13-trans-trienoic acid and 9α,15α-bis(4'-methoxytetrahydropyran-4'-yloxy)prosta-5-cis,11,13-trans-trienoic acid, via the corresponding methyl esters.

Likewise 9β,15α-dihydroxyprosta-5-cis,11,13-trans-trienoic acid methyl ester, 9α,15α-dihydroxy-20-ethylprosta-5-cis,11,13-trans-trienoic acid methyl ester and 9-keto-15α-hydroxyprosta-5-cis,11,13-trans-trienoic acid methyl ester are converted into the corresponding bis or mono-tetrahydropyranyl, tetrahydrofuranyl or 4-methoxytetrahydropyranyl ethers.

I claim:

1. A compound selected from the group of those represented by the following formulas:

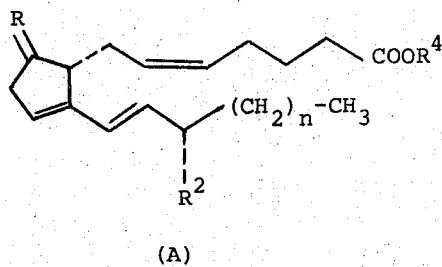

(A)

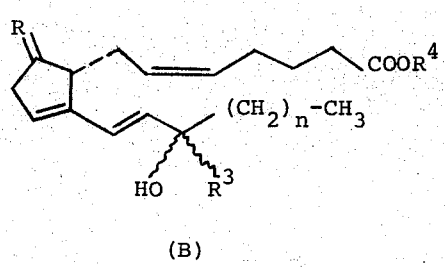

(B)

wherein
R is the grouping

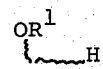

in which R¹ is hydrogen, tetrahydrofuran-2-yloxy, tetrahydropyran-2-yloxy, 4-methoxytetrahydropyran-4-yloxy, a hydrocarbon carboxylic acyloxy group containing from 1 to 12 carbon atoms or a substituted hydrocarbon carboxylic acyloxy group having from 1 to 12 carbon atoms wherein the substituent is selected from the group consisting of hydroxy, alkoxy containing up to twelve carbon atoms, nitro, amino and halogen;

R² is hydroxy, tetrahydrofuran-2-yloxy, tetrahydropyran-2-yloxy, 4-methoxytetrahydropyran-4-yloxy, a hydrocarbon carboxylic acyloxy group containing from 1 to 12 carbon atoms or a substituted hydrocarbon carboxylic acyloxy group having from 1 to 12 carbon atoms wherein the substituent is selected from the group consisting of hydroxy, alkoxy containing up to twelve carbon atoms, nitro, amino and halogen;

$R^3$ is methyl, ethyl or propyl;

$R^4$ is hydrogen, a lower alkyl group or the pharmaceutically acceptable, non-toxic salts of compounds in which $R^4$ is hydrogen; $n$ is an integer of from 2 to 9; and the wavy lines ($\xi$) indicate the $\alpha$ or $\beta$ configuration, or mixtures thereof.

2. A compound according to claim 1 wherein R is $\alpha$-hydroxy-$\beta$-hydrogen and $R^4$ is hydrogen.

3. A compound according to claim 1 wherein R is $\beta$-hydroxy-$\alpha$-hydrogen and $R^4$ is hydrogen.

4. A compound according to claim 1 wherein $n$ is 4.

5. A compound according to claim 1 wherein $n$ is 6.

6. A compound according to claim 1 formula (A) wherein R is $\alpha$-hydroxy-$\beta$-hydrogen, $R^2$ is hydroxy, $R^4$ is hydrogen and $n$ is 4, 9$\alpha$,15$\alpha$-dihydroxyprosta-5-cis,11,13-trans-trienoic acid and the non-toxic, pharmaceutically acceptable salts thereof.

7. A compound according to claim 1 formula (A) wherein R is $\alpha$-hydroxy-$\beta$-hydrogen, $R^2$ is hydroxy, $R^4$ is methyl and $n$ is 4, 9$\alpha$-15$\alpha$-dihydroxyprosta-5-cis,11,13-trans-trienoic acid methyl ester.

8. A compound according to claim 1 formula (A) wherein R is $\alpha$-hydroxy-$\beta$-hydrogen, $R^2$ is hydroxy, $R^4$ is hydrogen and $n$ is 6, 9$\alpha$,15$\alpha$-dihydroxy-20-ethylprosta-5-cis,11,13-trans-trienoic acid and the non-toxic, pharmaceutically acceptable salts thereof.

9. A compound according to claim 1 formula (A) wherein R is $\beta$-hydroxy-$\alpha$-hydrogen, $R^2$ is hydroxy, $R^4$ is hydrogen and $n$ is 4, 9$\beta$,15$\alpha$-dihydroxyprosta-5-cis,11,13-trans-trienoic acid and the non-toxic, pharmaceutically acceptable salts thereof.

10. A compound according to claim 1 formula (A) wherein R is $\beta$-hydroxy-$\alpha$-hydrogen, $R^2$ is hydroxy, $R^4$ is methyl and $n$ is 4, 9$\beta$,15$\alpha$-dihydroxyprosta-5-cis,11,13-trans-trienoic acid methyl ester.

11. A compound according to claim 1 formula (A) wherein R is $\beta$-hydroxy-$\alpha$-hydrogen, $R^2$ is hydroxy, $R^4$ is hydrogen and $n$ is 6, 9$\beta$,15$\alpha$-dihydroxy-20-ethylprosta-5-cis,11,13-trans-trienoic acid and the non-toxic, pharmaceutically acceptable salts thereof.

12. A compound according to claim 1 formula (B) wherein R is $\alpha$-hydroxy-$\beta$-hydrogen, $R^3$ is $\beta$-methyl, $R^4$ is hydrogen and $n$ is 4, 15$\beta$-methyl-9$\alpha$,15$\alpha$-dihydroxyprosta-5-cis,11,13-trans-trienoic acid and the non-toxic, pharmaceutically acceptable salts thereof.

13. A compound according to claim 1 formula (B) wherein R is $\alpha$-hydroxy-$\beta$-hydrogen, $R^3$ is $\alpha$-methyl, $R^4$ is methyl and $n$ is 4, 15$\beta$-methyl-9$\alpha$,15$\alpha$-dihydroxyprosta-5-cis,11,13-trans-trienoic acid methyl ester.

14. A compound according to claim 1 formula (B) wherein R is $\alpha$-hydroxy-$\beta$-hydrogen, $R^3$ is $\beta$-methyl, $R^4$ is hydrogen and $n$ is 6, 15$\beta$-methyl-9$\alpha$,15$\alpha$-dihydroxy-20-ethylprosta-5-cis,11,13-trans-trienoic acid and the non-toxic, pharmaceutically acceptable salts thereof.

15. A compound according to claim 1 formula (B) wherein R is $\beta$-hydroxy-$\alpha$-hydrogen, $R^3$ is $\beta$-methyl, $R^4$ is hydrogen and $n$ is 4, 15$\beta$-methyl-9$\beta$,15$\alpha$Dihydroxyprosta-5-cis,11,13-trans-trienoic acid and the non-toxic, pharmaceutically acceptable salts thereof.

16. A compound according to claim 1 formula (B) wherein R is $\beta$-hydroxy-$\alpha$-hydrogen, $R^3$ is $\beta$-methyl, $R^4$ is methyl and $n$ is 4, 15$\beta$-methyl-9$\beta$,15$\alpha$-dihydroxyprosta-5-cis,11,13-trans-trienoic acid methyl ester.

* * * * *

UNITED STATES PATENT OFFICE
CERTIFICATE OF CORRECTION

Patent No. 3,872,149              Dated    March 18, 1975

Inventor(s)  PIERRE CRABBE

It is certified that error appears in the above-identified patent and that said Letters Patent are hereby corrected as shown below:

Column 3, line 8, "inclined" should read --- included ---.

Column 8, line 25, "sodiuim" should read --- sodium ---. Column 13, line 23, "of" should read --- by ---. Column 13, line 41, "1'β-yl)" should read --- 1'α-yl ---. Column 16, line 15, "αyl" should read --- α-yl ---. Column 23, line 9, "cis11" should read --- cis,11 ---. Column 23, line 21, "pentylprosta5" should read --- pentylprosta-5 ---. Column 24, line 48, "here" should there ---. Column 25, line 6, "methyl9α" should read --- methyl-9α ---. Column 25, line 10, "β20" should read --- β,20 ---. Column 25, line 26, "Colline" should read --- Collins ---. Column 25, line 40, "$R^4$" should read --- $R^{4'}$ ---. Column 26, line 2, "to", second occurrence, read --- the ---. Column 26, line 15, "$R^4$ should read --- $R^4$ ---. Column 27, line 63, "chromatograpy" should read --- chromatography ---. Column 30, line 14, "α-methyl" should read --- β-methyl ---. Column 30, line 26, "Dihydroxyprosta" should read --- dihydroxyprosta ---.

Signed and Sealed this second Day of December 1975

[SEAL]

Attest:

RUTH C. MASON
Attesting Officer

C. MARSHALL DANN
Commissioner of Patents and Trademarks